Feb. 7, 1967  K. E. SPRINGER  3,303,387
ELECTRONIC CIRCUIT BREAKER FOR INTERRUPTING LOAD CURRENT
WHEN BREAKER TRANSISTOR IS DRIVEN OUT OF SATURATION
Filed July 19, 1963
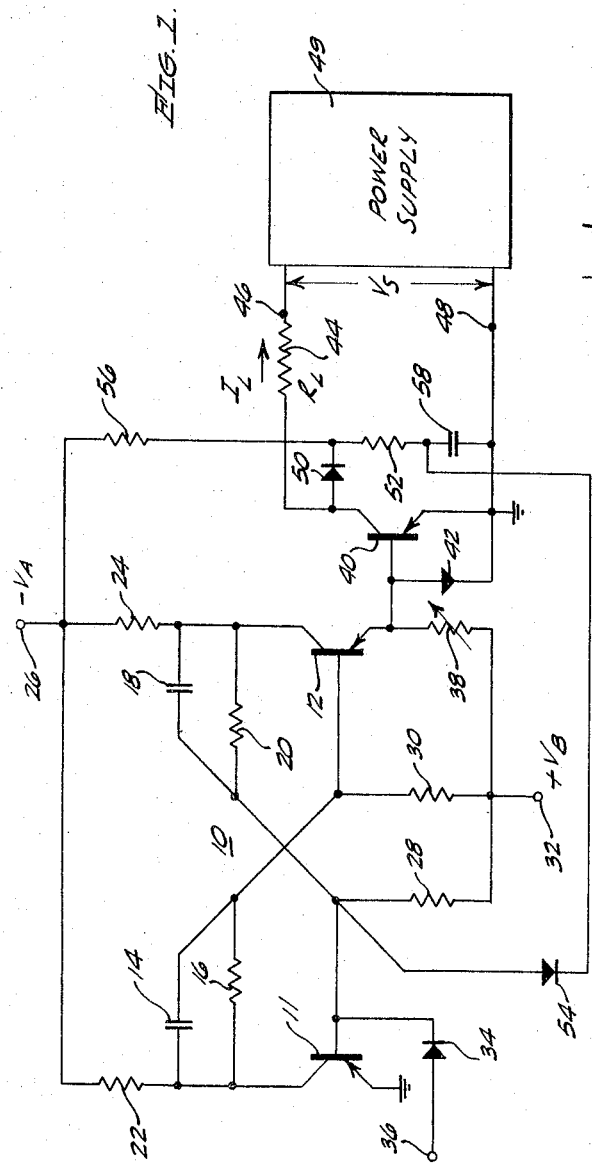
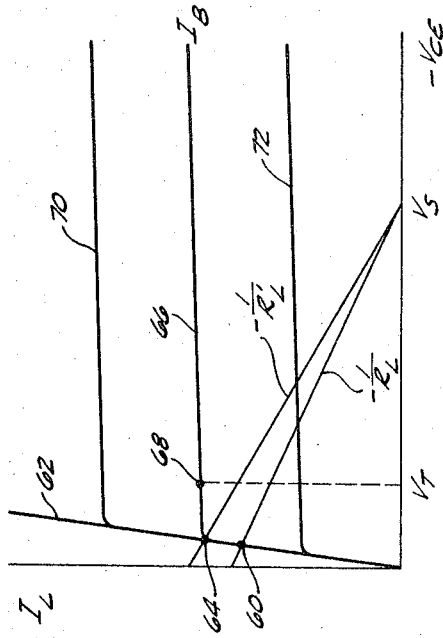
INVENTOR
KARL E. SPRINGER,
BY
Paul M. Coble
ATTORNEY.

United States Patent Office 3,303,387
Patented Feb. 7, 1967

3,303,387
ELECTRONIC CIRCUIT BREAKER FOR INTERRUPTING LOAD CURRENT WHEN BREAKER TRANSISTOR IS DRIVEN OUT OF SATURATION
Karl E. Springer, Inglewood, Calif., assignor to Hughes Aircraft Company, Culver City, Calif., a corporation of Delaware
Filed July 19, 1963, Ser. No. 296,257
7 Claims. (Cl. 317—31)

This invention relates generally to overload protection, and more particularly relates to an electronic circuit breaker for interrupting current to a load when the load current exceeds a predetermined precisely defined trip level.

In transistor circuit breakers of the prior art, changes in current flow through a sensing resistor produced by an overload condition have been used to alter the bias on one or more control transistors to either cut off the control transistor or render it conductive. This change in the conductive condition of the control transistor cuts off a regulator transistor connected in series with the load to prevent the application of current to the load. A problem encountered in such circuits is obtaining a well defined and accurate current trip level at which circuit breaking action is achieved.

Accordingly, it is an object of the present invention to provide a simple transistorized electronic circuit breaker having an extremely precise current trip level.

It is a further object of the present invention to provide a simple and reliable overload protection circuit for rapidly an defficiently disconnecting a load from either a stabilized or an unstabilized power supply upon the occurrence of an overload condtion of a readily variable preselected magnitude.

The objects set forth above are accomplished by the present invention by coupling the current path of a semiconductor device such as a transistor in series with the load to be protected. As long as the load current does not exceed a predetermined value the transistor is biased to a saturated conductive condition by means of a bistable device which is maintained in a first stable state. However, when the load current exceeds the predetermined trip value, the transistor becomes unsaturated, providing a signal which triggers the bistable device to a second stable state. When in its second stable state, the bistable device biases the transistor to a nonconductive condition to prevent the application of current to the load.

Additional objects, advantages and characteristic features of the present invention will become readily apparent from the following detailed description of a preferred embodiment of the present invention when taken in conjunction with the accompanying drawing in which:

FIG. 1 is a schematic circuit diagram of a circuit breaker provided in accordance with the principles of the present invention; and FIG. 2 is a graph of current-voltage characteristics for the breaker transistor of the circuit of FIG. 1 which is used in explaining the operation of the circuit.

Referring to FIG. 1 with more particularity, the circuit breaker of the present invention may be seen to include a bistable multivibrator, or flip-flop, 10 comprising first and second similar semiconductor amplifying devices 11 and 12, respectively. Although the amplifying devices 11 and 12 are illustrated as PNP transistors, it is to be understood that other semiconductor devices such as NPN transistors may alternatively be employed. The collector electrode of the first transistor 11 is connected to the base electrode of the second transistor 12 by means of a parallel network consisting of a capacitor 14 and a resistor 16, while the collector electrode of the second transistor 12 is similarly connected to the base electrode of the first transistor 11 via a parallel capacitor 18 and resistor 20.

The collector electrodes of the transistors 11 and 12 are also connected through respective resistors 22 and 24 to a terminal 26 supplying a bias potential of $-V_A$, while resistors 28 and 30 connect the respective base electrodes of the transistors 11 and 12 to a terminal 32 supplying a bias potential of $+V_B$. The emitter electrode of the transistor 11 is connected to a level of reference potential designated as ground, while a diode 34 is connected between the base electrode of the transistor 11 and a terminal 36 adapted to receive positive trigger pulses for resetting the flip-flop 10. The emitter electrode of the transistor 12 is connected to the $+V_B$ terminal 32 by means of a variable resistor 38 used to vary the current trip level of the circuit in the manner to be pointed out below.

The output from the flip-flop 10, which is obtained at the emitter electrode of the transistor 12, is applied to the base electrode of a breaker transistor 40 of the PNP variety. The emitter electrode of the breaker transistor 40 is grounded, with a bias limiting diode 42 being connected directly between the base and emitter electrodes of the transistor 40. The collector of the transistor 40 is connected to one end of a load 44 which, for illustrative purposes, is shown as a resistor $R_L$. The other end of the load 44 is connected to a terminal 46 which, along with a ground terminal 48, may be connected across a power supply 49 providing either a stabilized or an unstabilized voltage $V_S$. The current $I_L$ which flows through the load 44 is equal to the collector current of the transistor 40 except for the very small fraction of collector current which flows through a diode 50 connected to the collector electrode of the transistor 40.

The collector electrode of the breaker transistor 40 is connected to the input to the flip-flop 10, i.e. to the base electrode of the transistor 11, by means of the diode 50, a resistor 52, and an isolating diode 54 connected in series. A resistor 56 is connected between the $-V_A$ bias terminal 26 and the junction between the diode 50 and the resistor 52, while a capacitor 58 interconnects the other end of the resistor 52 with ground.

In the operation of the circuit of the present invention, under normal conditions load current $I_L$ flows from the terminal 48 of the power supply 49 through the emitter-collector path of the transistor 40 and through the load 44 to the terminal 46. The transistor 40 is maintained conductive by the flip-flop 10 which is set to the one of its two stable states in which the transistor 12 is conductive while the transistor 11 is cut off. This may be done, for example, by applying a positive trigger pulse to the reset terminal 36 to render the transistor 11 nonconductive. The ensuing change in potential in a negative direction at the collector of the transistor 11 is applied to the base of transistor 12 to render the transistor 12 conductive. When the flip-flop 10 is in the aforementioned state in which the transistor 12 is conductive, the flow of current into its emitter through the resistor 38 establishes a bias at the base of the breaker transistor 40 which maintains the transistor 40 conducting in a saturated condition. At this time the operating condition of the transistor 40 is illustrated by the operating point 60 of FIG. 2 defined by the intersection of the load line $-1/R_L$ with the collector current saturation curve 62 for the transistor 40.

Upon the occurrence of a change in load conditions which decreases the load resistance $R_L$ to a new level $R_L'$, the load current $I_L$ increases to that represented by the operating point 64 at the intersection of the saturation curve 62 with the load line $-1/R_L'$. The operating point 64 marks the impedance transition point of the circuit, since for further increases in load current the transistor 40 will no longer operate along the saturation curve 62, but rather the operating point will move outwardly along the curve 66 defined by the selected value of base current $I_B$.

It may be observed that as the operating point moves outwardly along the curve 66, the magnitude of the collector-emitter voltage $V_{CE}$ of the transistor 40 increases much more rapidly with increases in load current $I_L$ than when the transistor is operating along the saturation curve 62. Thus, after the transition point 64 is traversed, the negative going potential at the collector of the transistor 40 rapidly reaches the trip level $V_T$ at point 68 along the curve 66. At this time a reverse bias is placed across the diode 50 to remove the formerly existing conductive path for a small portion of the collector current from the transistor 40 through the resistor 56 to the terminal 26. The resulting decrease in current flow through the resistor 56 enables a changing potential in a negative direction to be applied from the terminal 26 through the resistors 56 and 52 and the diode 54 to the base of the transistor 11. The transistor 11 is rendered conductive by the negative voltage applied to its base, and the resulting rise in potential at the collector of the transistor 11 is applied to the base of the transistor 12 to cut off the transistor 12, thereby changing the state of the flip-flop 10 to its other stable state.

When the transistor 12 becomes nonconductive current flow through the variable resistor 38 decreases, causing the potential at the base of the transistor 40 to rise toward $+V_B$ to bias the transistor 40 out of conduction, the magnitude of the reverse bias across the emitter-base of the transistor 40 being limited by the diode 42. When the transistor 40 is cut off current flow between the terminals 48 and 46 is prevented, and the power supply 49 is effectively disconnected from the load 44.

While the breaker transistor 40 is nonconductive the diode 50 prevents the establishment of a leakage path for load current (through the emitter-base of the transistor 11, the diode 54, and the resistor 52) which would otherwise exist in the absence of the diode 50.

After the overload has been removed, resetting of the circuit may be accomplished by applying a positive trigger pulse to the terminal 36 to cut off the transistor 11 and render the transistor 12 conductive. The ensuing current flow through the resistor 38 once again biases the breaker transistor 40 to a saturated condition to allow current flow through the load 44 to resume. It is pointed out that resetting of the flip-flop 10 need not be done electrically by means of a trigger pulse, but may also be accomplished manually, for example, by momentarily opening a normally closed switch in the emitter circuit of the transistor 11.

When the circuit is operating with the flip-flop 10 in its reset condition (transistor 12 conducting) and the transistor 40 saturated, the capacitor 58 prevents spurious triggering of the flip-flop 10 by momentary overloads. The diode 54 serves to isolate the load circuit from the flip-flop 10 during resetting of the flip-flop.

The particular value of load current at which breaking action occurs may be precisely controlled and readily set at the desired trip level by adjusting the resistor 38. An approximate relation for the value of load current $I_T$ at which breaking action will occur may be determined by assuming that when the transistor 12 is conductive its collector resides at essentially ground potential and its base current and collector-emitter voltage are negligible. The emitter current for the transistor 12 thus becomes $V_A/R_{24}$ where $R_{24}$ is the resistance of the resistor 24; while the current flow through the resistor 38 is given by $V_B/R_{38}$ where $R_{38}$ is the resistance of the resistor 38. Since the base current of the transistor 40 is equal to the difference between the emitter current of the transistor 12 and the current through the resistor 38, the current trip level $I_T$ becomes $$I_T \simeq \left(\frac{V_A}{R_{24}} - \frac{V_B}{R_{37}}\right)\beta_{04} \qquad (1)$$

where $\beta_{40}$ is the current amplification factor for the transistor 40 at the transition between saturation and unsaturation.

As may be seen from Equation 1 as the value of the variable resistor 38 is increased, the level of base current $I_B$ required to change the transistor 40 from its saturated to its unsaturated state is increased, for example to that shown by the curve 70 of FIG. 2. Similarly, as the value of the resistor 38 is decreased, the level of base trip current is decreased, such as to that depicted by the curve 72 of FIG. 2. The value of the resistor 38 is thus selected to provide the particular value of base current for the transistor 40 which will unsaturate the transistor 40 at the desired trip level $I_T$ of its collector current thereby affording a well defined and variable load current level at which circuit breaking action is achieved.

The circuit of this invention provides a fast acting circuit breaker for low voltage D.C. loads such as small motors, heaters and numerous other devices without requiring any moving parts. Moreover, the trip level is highly precise and readily controllable, and relatively high currents may be accommodated.

Although the invention has been shown and described with reference to a particular embodiment, various changes and modifications obvious to a person skilled in the art to which the invention pertains are deemed to lie within the spirit and scope of the invention as set forth in the appended claims:

What is claimed is:

1. An electrical circuit breaker for interrupting current flow in a current path when the current therethrough exceeds a predetermined value comprising: a semiconductor device having a current path and a control electrode, means for supplying current to said current path, a bistable device having an input circuit and an output circuit, means intercoupling said output circuit with said control electrode for biasing said semiconductor device to provide saturated current flow through said current path as long as the current therethrough does not exceed a predetermined value while allowing said current path to become unsaturated when the current therethrough exceeds said predetermined value when said bistable device is in a first stable state and for biasing said semiconductor device to render said current path nonconductive when said bistable device is in a second stable state, and means coupled between said current path and said input circuit for triggering said bistable device to said second stable state when the current through said current path exceeds said predetermined value and said current path thereby becomes unsaturated.

2. An electrical circuit breaker for interrupting current flow in a current path when the current therethrough exceeds a predetermined value comprising: a transistor having a first electrode, a second electrode, and a control electrode; means for normally biasing said transistor to cause current flow therethrough between said first and second electrodes, a bistable device having an input circuit and an output circuit; means intercoupling said output circuit with said control electrode and operative when said bistable device is in a first stable state to bias said transistor to provide saturated current flow between said first and second electrodes as long as the current flow therebetween does not exceed a predetermined value while allowing said transistor to become unsaturated when the current flow through said transistor between said first and second electrodes exceeds said predetermined value whereby a voltage increase is provided between said first and second electrodes and operative when said bistable device is in a second stable state to bias said transistor to prevent current flow between said first and second electrodes; and means coupled between said second electrode and said input circuit for triggering said bistable device to said second stable state when said transistor becomes unsaturated and the voltage between said first and second electrodes thereby exceeds a preselected value.

3. An electrical circuit breaker for interrupting current from a power supply to a load when the load current exceeds a predetermined value comprising: a bistable multivibrator including first and second transistors each having an emitter, a base and a collector electrode, the collector electrode of said first transistor being coupled to the base electrode of said second transistor, the collector electrode of said second transistor being coupled to the base electrode of said first transistor, said multivibrator having a first stable state in which said first transistor is nonconductive of current and said second transistor is conductive of current and a second stable state in which said first transistor is conductive of current and said second transistor is nonconductive of current; means for setting said multivibrator to said first stable state; a third transistor having an emitter, a base and a collector electrode; the emitter electrode of said third transistor being coupled to the emitter electrode of said first transistor a power supply having one terminal coupled to the emitter electrode of said third transistor; a load coupled between the collector electrode of said third transistor and another terminal of said power supply; bias means coupled to the base electrode of said third transistor and to the emitter electrode of said second transistor for biasing said third transistor to maintain saturated flow through its emitter-collector path as long as the load current does not exceed a predetermined value while allowing said emitter-collector path to become unsaturated when the load current exceeds said predetermined value when said second transistor is conductive of current and for biasing said third transistor to render said emitter-collector path nonconductive of current when said second transistor is nonconductive of current; and circuit means coupled between the collector electrode of said third transistor and the base electrode of said first transistor to render said first transistor conductive of current and thereby place said multivibrator in said second stable state when said emitter-collector path becomes unsaturated and the magnitude of the voltage between the collector and emitter electrodes of said third transistor thereby exceeds a preselected value.

4. An electrical circuit breaker according to claim 3 wherein said bias means includes a variable resistor having one thermal coupled to a source of potential and another terminal coupled to the base electrode of said third transistor and to the emitter electrode of said second transistor whereby said predetermined value of load current may be varied.

5. An electrical circuit breaker according to claim 3 wherein said circuit means includes means for preventing a leakage path for load current through said circuit means when the emitter-collector path of said third transistor is nonconductive of current.

6. An electrical circuit breaker for interrupting current to a load when the load current exceeds a predetermined value comprising: first, second and third transistors each having an emitter electrode, a base electrode and a collector electrode; the collector electrode of said first transistor being coupled to the base electrode of said second transistor; the collector electrode of said second transistor being coupled to the base electrode of said first transistor; a source of bias potential; first and second resistive means respectively coupling one terminal of said source of bias potential to the collector electrodes of said first and second transistors; third and fourth resistive means respectively coupling another terminal of said source of bias potential to the base electrodes of said first and second transistors; first circuit means intercoupling the emitter electrode of said third transistor with the emitter electrode of said first transistor; second circuit means intercoupling the base electrode of said third transistor with the emitter electrode of said second transistor; a resistor coupled between said another terminal of said source of bias potential and the emitter electrode of said second transistor; third circuit means intercoupling the collector electrode of said third transistor with the base electrode of said first transistor; and a load coupled to the collector electrode of said third transistor.

7. An electrical circuit breaker for interrupting current to a load when the load current exceeds a predetermined value comprising: first, second and third transistors each having an emitter electrode, a base electrode and a collector electrode; the collector electrode of said first transistor being coupled to the base electrode of said second transistor; the collector electrode of said second transistor being coupled to the base electrode of said first transistor; a source of bias potential; first and second resistors respectively coupling one terminal of said source of bias potential to the collector electrodes of said first and second transistors; third and fourth resistors respectively coupling another terminal of said source of bias potential to the base electrodes of said first and second transistors; first circuit mean intercoupling the emitter electrode of said third transistor with the emitter electrode of said first transistor; second circuit means intercoupling the base electrode of said third transistor with the emitter electrode of said second transistor; a variable resistor coupled between said another terminal of said source of bias potential and the emitter electrode of said second transistor; a first diode coupled between the base and emitter electrodes of said third transistor; a capacitor having one terminal coupled to the emitter electrode of said third transistor; fifth and sixth resistors coupled in series between the other terminal of said capacitor and said one terminal of said source of bias potential; a second diode coupled between the collector electrode of said third transistor and the junction between said fifth and sixth resistors; a third diode coupled between said other terminal of said capacitor and the base electrode of said first transistor; and a load coupled to the collector electrode of said third transistor.

References Cited by the Examiner
UNITED STATES PATENTS

| | | | |
|---|---|---|---|
| 2,972,685 | 2/1961 | Baude | 317—33 X |
| 3,078,410 | 2/1963 | Thomas | 317—33 |
| 3,104,353 | 9/1963 | Theobald | 317—33 X |
| 3,113,260 | 12/1963 | Wiley | 317—33 X |
| 3,122,646 | 2/1964 | Deysher et al. | 307—88.5 |
| 3,173,078 | 3/1965 | Farnsworth | 317—33 X |

MILTON O. HIRSHFIELD, *Primary Examiner.*

R. V. LUPO, *Assistant Examiner.*

UNITED STATES PATENT OFFICE
CERTIFICATE OF CORRECTION

Patent No. 3,303,387　　　　　　　　　　　　　　February 7, 1967

Karl E. Springer

It is hereby certified that error appears in the above numbered patent requiring correction and that the said Letters Patent should read as corrected below.

Column 1, line 32, for "an defficiently" read -- and efficiently --; column 4, line 15, the formula should appear as shown below instead of as in the patent:

$$I_T = \left(\frac{V_A}{R_{24}} - \frac{V_B}{R_{38}}\right)\beta 40$$

column 5, line 44, after "saturated" insert -- current --; line 63, for "thermal" read -- terminal --; column 6, line 40, for "mean" read -- means --.

Signed and sealed this 17th day of October 1967.

(SEAL)
Attest:

EDWARD M. FLETCHER, JR.　　　　　　　　　EDWARD J. BRENNER
Attesting Officer　　　　　　　　　　　　Commissioner of Patents